United States Patent [19]
Fior

[11] Patent Number: 5,630,640
[45] Date of Patent: May 20, 1997

[54] VEHICLE WITH A DEFLECTING DEVICE FORMING A FRONT AIR SCREEN

[76] Inventor: Claude Fior, Caupenne d'Armagnac, 32110 Nogaro, France

[21] Appl. No.: 610,457

[22] Filed: Mar. 4, 1996

[30] Foreign Application Priority Data

Mar. 6, 1995 [FR] France ................... 95 02891

[51] Int. Cl.⁶ .................................. B60J 1/20
[52] U.S. Cl. ....................................... 296/91
[58] Field of Search .................... 296/91, 180.1

[56] References Cited

U.S. PATENT DOCUMENTS

| | | | |
|---|---|---|---|
| 978,254 | 12/1910 | Winslow | 296/91 |
| 2,184,798 | 12/1939 | Gracey | 296/91 |
| 2,184,995 | 12/1939 | Eriksen | 296/91 |
| 2,243,029 | 5/1941 | Cupit | 296/91 |
| 2,930,650 | 3/1960 | Vosen | 296/91 X |
| 3,214,215 | 10/1965 | Hansen | 296/91 |
| 3,616,871 | 11/1971 | West | 296/91 X |
| 3,647,256 | 3/1972 | Cox | 296/91 |
| 3,929,369 | 12/1975 | Blair | 296/91 X |

FOREIGN PATENT DOCUMENTS

| | | | |
|---|---|---|---|
| 749596 | 7/1933 | France | 296/91 |
| 779.034 | 3/1935 | France . | |
| 1287971 | 12/1962 | France | 296/91 |
| 1.564.532 | 4/1969 | France . | |
| 734 711 | 3/1943 | Germany . | |
| 7138183.4 | 6/1972 | Germany . | |
| 404056631 | 2/1992 | Japan | 296/91 |

*Primary Examiner*—Joseph D. Pape
*Attorney, Agent, or Firm*—Young & Thompson

[57] ABSTRACT

The invention concerns a vehicle having a deflecting surface (6) attached to the vehicle in front of at least one front place (4, 5), which is concave with a concavity facing forwards, which extends overall at least essentially in the transverse direction of the said vehicle so as to receive a relative air current (10) when the vehicle is moving, and which has an upper trailing edge pointing upwards; and at least one wing (7) fixed in the relative air current (10) immediately upstream, facing and adjacent to the deflecting surface (6). The deflecting surface (6) and the wing(s) (7) extend below the lower horizontal plane (8) passing through the standard zone (11) in which the eyes are situated and are adapted to form an air flow (9) deflected upwards able to act as an air screen in front of the said standard zone (11) in which the eyes are situated in which the air is at least essentially still.

37 Claims, 6 Drawing Sheets

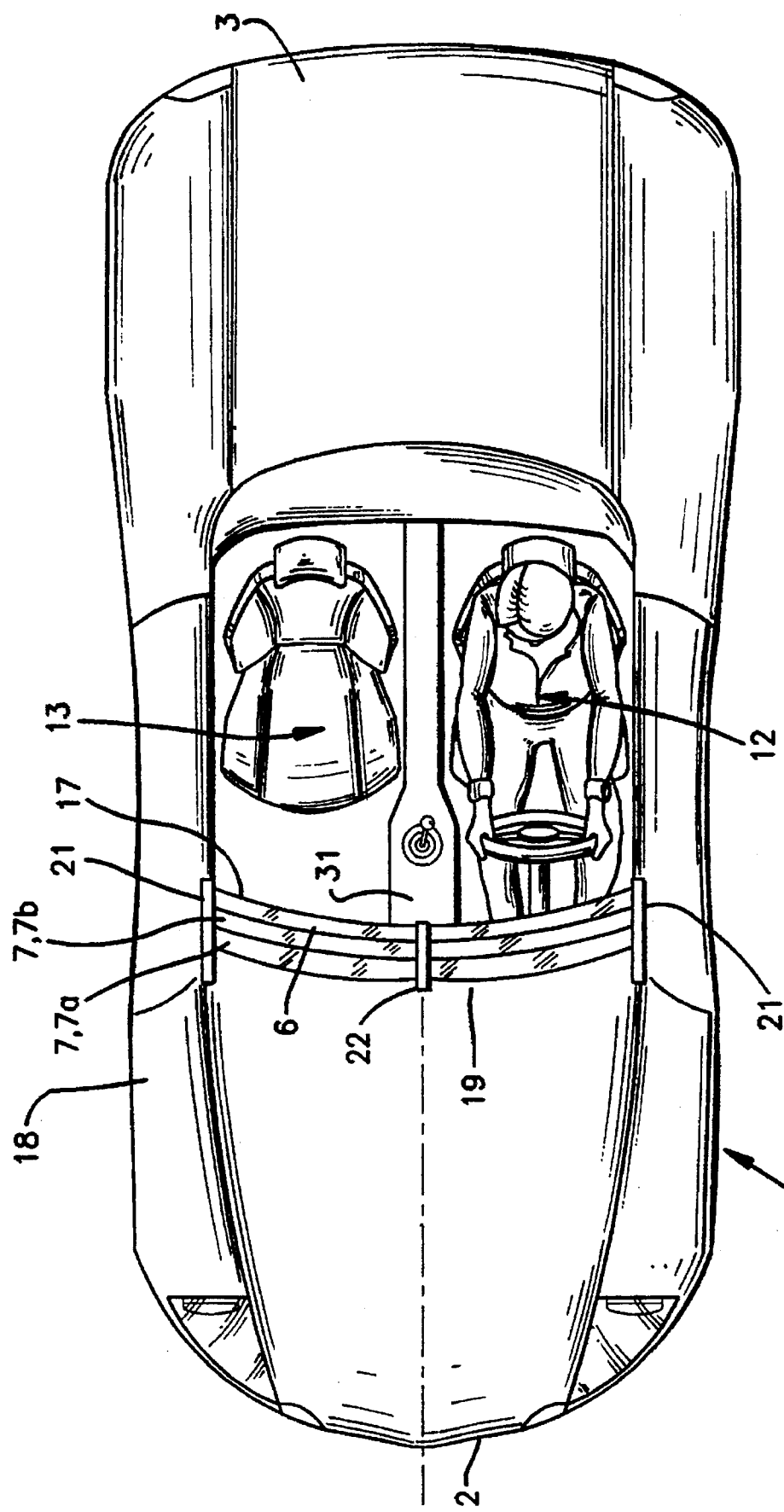

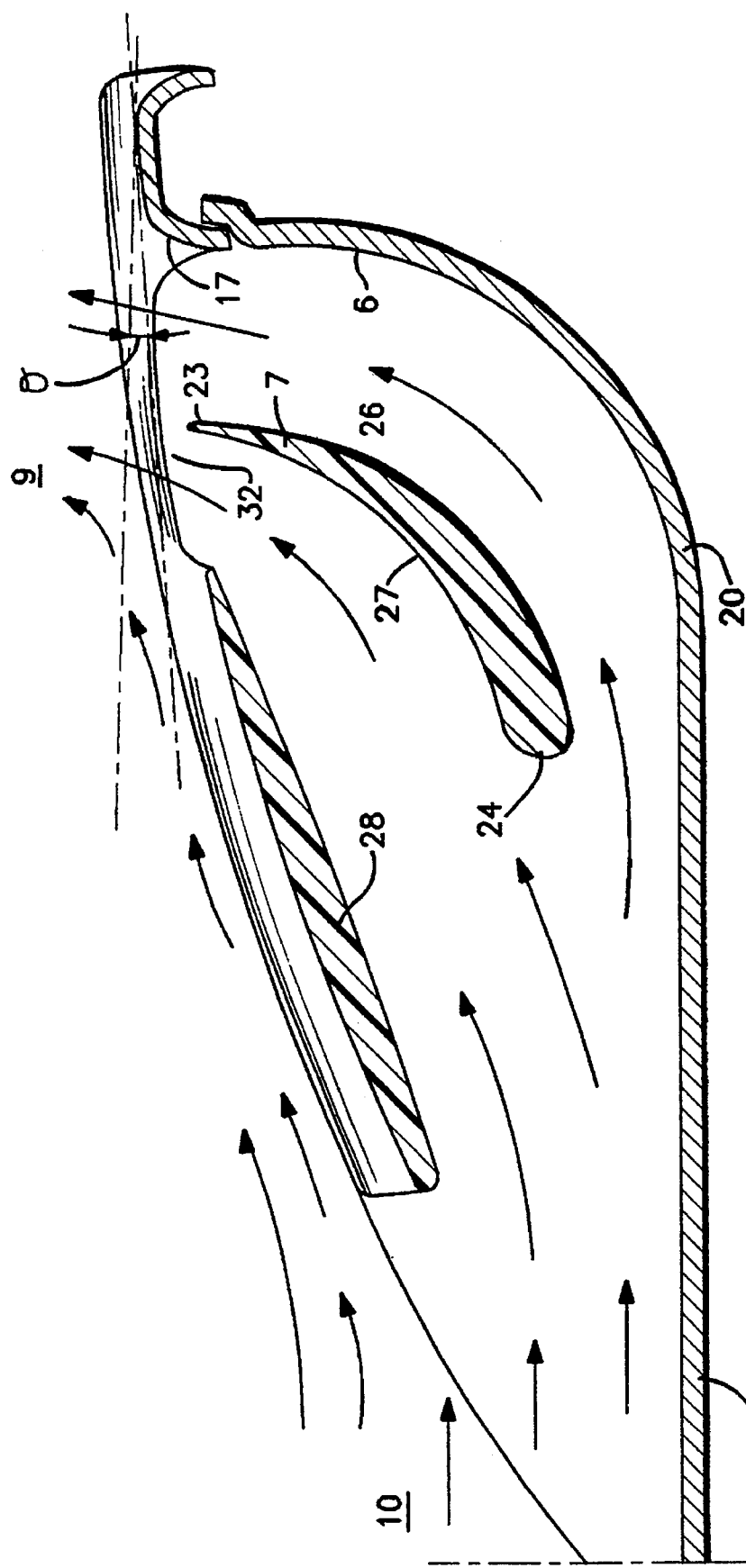

VEHICLE WITH A DEFLECTING DEVICE FORMING A FRONT AIR SCREEN

FIELD OF THE INVENTION

The invention concerns a vehicle intended to travel at subsonic speed comprising means such as a passenger compartment, a seat, a saddle etc, defining at least one front place for at least one occupant, namely at least one space tot receiving the driver(s) and/or passenger(s) which is not preceded to the front in the direction of travel of the vehicle, by another place for a driver or a passenger.

BACKGROUND OF THE INVENTION

Known vehicles are either fitted with a windscreen, namely a transparent partition interposed in the field of vision of the front place(s) (cars. aircraft, tourist boats or sports boats etc), or do not have any windscreen or deflector (two-wheeled vehicles, karts etc) or are fitted with streamlining or a deflector intended to improve the aerodynamic properties of the vehicle (in particular by reducing drag) and sometimes to limit the air pressure on the occupant(s) of the said front place(s) resulting from the movement of the vehicle (motorcycles, side-cars, cars or motor boats, competition vehicles, etc).

When the vehicle is fitted with a windscreen, the occupant (s) of the said front place(s) does/do not in general wear a helmet or goggles.

On the other hand, in the latter two cases referred to above the occupant(s) receive(s) directly at least part of the air current due to movement. In particular, it is essential to wear a helmet with a visor or goggles to ensure the visual comfort of the occupant(s).

Many systems with wings or grills of wings have already been proposed in the past in connection with a vehicle, with various objectives, but none of these has been exploited. Thus, DE-C-734 711 describes an improved device reducing resistance to the forward movement of an object such as a vehicle through the air comprising projecting deflecting wings provided with one or more openings through which an air supply is produced for the dead space between the front surfaces and the front part of the vehicle to be protected. A feature of this improvement is that convex curved wings arranged at the rear regulate the removal of air from the dead space, and/or the openings diverging to the rear for supplying the zone with still air are subdivided into nozzles adjacent to intermediate wings. Part of the air current is not deflected but the combination of front and rear surfaces creates an arched air flow which prevents side wind from passing between them (page 2, lines 15, 30). This document, which was aimed at the side protection of passengers an a time when vehicles travelled only slowly, did not envisage dispensing with the windscreen of the vehicle. In addition, this document considers it to be indispensable to provide, behind the front deflecting wings, openings for supplying air to the still air zone.

Moreover, other devices are also already known for deflecting the air in front of a windscreen to prevent it from becoming soiled too rapidly.

Thus, a protective partition is more often interposed between the eyes of the occupant(s) and the outside. It has generally been considered in point of fact right from the start that the absence of a protective partition (windscreen or goggles) in front of the eyes is only possible with vehicles which travel very slowly (bicycles, sailing boats, etc).

SUMMARY OF THE INVENTION

In this context, the object of the invention is to provide new category of vehicle which can travel at any subsonic speed, which does not have any partition in front of the eyes of the occupant(s) in the direction of movement of the vehicle, but which nevertheless ensures the comfort, in particular the visual comfort, of the occupant(s).

The object of the invention is thus to provide a novel category of vehicle producing new sensations resulting from astonishing comfort at any speed in spite of the absence of a windscreen in front of the eyes.

For this purpose, the object of the invention is to provide a vehicle free from a protective partition in front of the eyes of the occupant(s) but which can be used at speeds including high speeds (300 km/h or more) without turbulence or draughts in all or the greater part of the space occupied by the front place(s).

More particularly, the object of the invention is to provide such a vehicle which can be used with the eyes open, without goggles or a visor, by the occupant(s) of the front place(s).

The object of the invention is also to provide such a vehicle not having a windscreen or partition in the field of vision of the occupant(s).

The object of the invention is more particularly to provide a vehicle such as a car in which the forward field of vision of the occupant(s) is totally free but in which the occupant(s) is or are protected from turbulence and draughts, in particular at least at eye level.

The object of the invention is in addition to provide a vehicle with which these results are achieved in an economical and particularly aesthetic manner.

In order to do this, the invention concerns a vehicle intended to travel at a subsonic speed, comprising means defining at least one front place for at least one occupant with a standard zone in which the eyes are situated, the said means being open at the front of the said zone, wherein:

- it comprises a deflecting surface attached to the vehicle in front of at least one front place, which extends overall at least essentially in the transverse direction of the said vehicle so as to receive a relative air current when the vehicle is moving,
- the said deflecting surface has a concave shape with the concavity facing frontwards and an upper trailing edge directed upwards,
- the deflecting surface is attached to a front portion of the body and/or the chassis receiving the relative air current and which extends in the rearwards extension of the front portion of the body and/or the chassis, so that at least a substantial fraction of this relative air current escapes above the trailing edge of the deflecting surface behind which the air is essentially still,
- it comprises at last one wing attached to the vehicle, which extends in the said relative air current immediately upstream, opposite and adjacent to the deflecting surface,
- the deflecting surface and the wing(s) extend below the lower horizontal plane passing through the said standard zone in which the eyes are situated,
- the deflecting surface and the wing(s) are adapted to form an air flow deflected upwards and able to act as an air screen in front of the said standard zone in which the eyes are situated, in which the air is essentially still, and in particular free from turbulence.

According to the invention, the function of the deflecting surface is to channel and to conduct at least a substantial fraction of the relative air current upwards and in contact with the extrados of the wing. Advantageously and according to the invention, the deflecting surface is rigidly attached in a sealed manner to a front tranverse portion of the body and/or chassis.

The expression "the deflecting surface is attached in a sealed manner" is understood to mean that normally no air flow inadvertently passes under this deflecting surface (between it and the element to which it is attached). Nevertheless, this concept does not exclude the possibility of providing air intakes or vents of a small size such as controlled ventilation vents for passengers, provided these air intakes or vents do not prevent the deflecting surface from carrying out its function of creating the deflected air flow with sufficient energy.

It is known that for any vehicle for which the means defining the front place(s) is determined, the regulations define a zone within which the position of the eyes of an occupant of standard height can vary. In point of fact, places of vehicles are designed and dimensioned in relation to occupants of standard height.

In particular, the upper standard horizontal level for the eyes of a person occupying the said front place corresponds to a maximum height that can be assumed by the eyes of a dummy with a standard height corresponding to the vehicle.

It has thus been determined, surprisingly, that simply combining concave deflecting surface and at least one wing placed immediately upstream opposite and adjacent to the deflecting surface in the relative air current, makes it possible to obtain very effective protection for the occupant by creating a space which extends to the rear and above the deflecting surface including at least the said standard zone in which the eyes are situated, in which the air is at least essentially still, and in particular not laminar or turbulent.

This space in which the air is still corresponds at least substantially to the space occupied by the front place, that is to say the space occupied by a passenger of standard height occupying the said front place. In the case of a seated position, it then consists of the space situated in front of the seat into which a person of normal height fits, when seated on the seat. The expression "corresponds at least substantially" is understood to mean that the said space in which the air is still extends throughout the greater part of the occupied space. Nevertheless this space cannot correspond exactly to the occupied space, and in particular can be slightly narrower or slightly shorter.

According to the invention, the deflecting device formed by the deflecting surface and the wing(s) is adapted to create an air flow flowing upwards in a laminar regime with sufficient energy to deflect all the relative air current due to movement of the vehicle above the said standard zone in which the eyes are situated, and more particularly above the space occupied by the said front place. The resulting air current thus passes above the upper horizontal plane passing through the said standard zone in which the eyes are situated, at a point situated in front of this zone.

Another feature of the vehicle according to the invention is that the deflecting device assembly formed by the deflecting surface and the wing(s) extends under the lower limit of the normal field of vision corresponding to the said front place, and is adapted so that the said deflected air flow flows upwards above the said standard zone in which the eyes are situated, and in that the vehicle has no front windscreen. More particularly, the resulting air current flows upwards and passes above the said zone in front of this zone.

In this way, and in spite of the absence of a windscreen and any partition in front of the said zone and the occupant's eyes, the occupant's eyes are protected in a calm space behind the air screen formed by the flow of deflected air.

The lower limit of the normal field of vision is a transverse plane passing through the said standard zone in which the eyes are situated, and which is tangential, towards the bottom, to the portion of the body of the vehicle situated in front of the said zone.

The invention more particularly applies to a vehicle comprising a front portion of the body extending in front of the front place(s) forming a continuous surface, at least essentially horizontal, between the front place(s) and the front end of the vehicle, such as a touring or sports car. The vehicle according to the invention is characterized in that the deflecting surface extends in a projection upwards in relation to the front portion of the body of the vehicle in the relative air current created along the front portion of the body.

The deflecting device formed by the deflecting surface and the wing or wings can be attached at any suitable place to the vehicle in front of the said front place. For example, it is possible to consider using such a deflecting device attached in the vicinity of the front grill of a car. Nevertheless, advantageously and according to the invention, the deflecting surface is attached immediately in front of the said front place in the rearwards extension of the rear part of the front portion of the body which is at least essentially horizontal, that is to say as far as possible to the rear on the front portion of the body. This rear part of the front portion of the body constitutes the said transverse element of the body and/or of the chassis mentioned above.

According to the invention, the deflecting surface then comprises a front connecting part which extends at least essentially horizontally forwards and is continuously attached tangentially on the rearwards extension of the rear part of the front portion of the body.

In addition, the deflecting device is placed towards the front in relation to the standard zone for the eyes, and in the space occupied by the front place, at a sufficient distance to prevent any contact with the occupant in the event of an accident. In particular, the deflecting device is sufficiently low and sufficiently far forward to prevent any impact with the head of the occupant in the event of an accident.

It should be noted, among the advantages of the invention, that the safety of the occupants is improved in as much as no partition is interposed in front of the heads of the occupants, since the windscreen has been removed. It is known, in point of fact, that the presence of a windscreen in vehicles of the prior art is a major cause of serious injuries in the event of an accident, particularly when the occupants omit to fasten their safety belts or when these are faulty.

A feature of a vehicle according to the invention is that the deflecting surface is profiled with a straight section passing through any longitudinal vertical plane which is a concave curve having a concavity facing forwards and the trailing edge of which is directed upwards forming an angle with the vertical direction which is less than 45°, in particular less than 10°.

According to the invention, the trailing edge of the deflecting surface as directed at least essentially vertically, that is to say at least essentially at 90° upwards in relation to the relative air current due to movement of the vehicle. It should be noted that this arrangement goes against accepted ideas according to which the greater the exit angle, the more turbulence is created. This in spite of a vertical or almost vertical trailing edge, it was possible, due to the invention and in a surprising manner, to create a laminar flow and to avoid any turbulence behind the deflecting surface.

Advantageously and according to the invention, the leading edge of the wing(s) extends facing above the said front part connecting the deflecting surface to the front portion of the body of the vehicle.

In addition, and according to the invention, the deflecting device assembly extends at least essentially along all the width of each front place, and in particular along all the width of the vehicle.

In addition, the trailing edge of the wing which is furthest downstream in the air current at least essentially faces the front of the trailing edge of the deflecting surface. The trailing edge of the wing situated furthest downstream is inclined forwards in relation to the vertical direction by an angle of between 0° and 45° in particular of the order of 30°. More particularly and according to the invention, this trailing edge is at least essentially vertical, that is to say at least essentially perpendicular to the said incident relative air current due to movement of the vehicle.

Each of the wings is arranged in the vicinity of the deflecting surface, that is to say at a distance such that it cooperates from the aerodynamic point of view with this deflecting surface or with an adjacent wing with a view to creating the said deflected air flow, in particular in a laminar regime, upwards.

According to the invention, the wing(s) has or have a shape which is overall concave with the concavity facing forwards which corresponds at least essentially to that of the deflecting surface. The curvature of the wing(s) is similar to that of the deflecting surface or is less than that of the deflecting surface.

According to the invention, the entry section defined between the leading edge of the wing(s) and the part closest to the defecting surface has an area less than that of the exit section defined between the trailing edge of the wing(s) and the part closest to the deflecting surface. In this way, the space comprised between the deflecting surface and the opposite wing or wings is overall divergent in relation to the direction of the airflow through which it passes.

In order to do this, according to the invention, the distance between the leading edge of the wing(s) and the deflecting surface is less than the distance between the trailing edge of the wing(s) and the deflecting surface. More precisely, the distance between the leading edge of the wing furthest upstream in the air current and the deflecting surface is less than the distance between the trailing edge of the wing furthest downstream in the air current and the deflecting surface.

Several variants of the invention are possible. In a first variant, the vehicle comprises a single wing in front of the deflecting surface. In this case, the curvature of the convex extrados of this wing is at least essentially the same as or less than or equal to the curvature of the deflecting surface.

In a second variant, the vehicle comprises several similar wings extending at least essentially parallel to each other, adjacent side by side to each other so as to form a grille of wings through which the relative air current passes. This grille of wings can extend at least essentially horizontally and/or essentially vertically in front of the deflecting surface.

In an advantageous embodiment and according to the invention, the vehicle comprises two wings arranged in relation to each other in the manner of a wing split along its length, namely a lower front wing arranged further forward and downwards, and an upper rear wing arranged further rearwards and upwards.

The shape of the profile of each of the wings as well as their blade angles, incidence angles and exit angles in relation to the air current are determined so as to obtain an airflow deflected upwards flowing in the above mentioned laminar regime.

It has in point of fact been noted that in spite of the small height available between the body and the lower limit of the normal field of vision, it is possible with a deflecting surface and one or more wings according to the invention, to obtain from the lowest speeds (about 10 km/h) up to the highest speeds (300 km/h or more), an extremely effective protection for the driver and/or the passenger in the said front place, due to the air screen thus formed. Thus, the occupant of the said front place has his or her field of vision entirely free in all horizontal directions, and in particular to the front of the vehicle, but even at high speed, is in a perfectly calm zone without a draught or turbulence. In particular, the occupant of the said front place can remain with the eyes perfectly open, without being disturbed in any manner. In addition, it has been noted that a conversation my be held in the vehicle in a normal voice, including at high speed, in spite of the absence of an enclosed passenger compartment.

On the other hand, it should be noted that these results are no longer obtained if any wing is removed opposite the deflecting surface and/or the deflecting surface itself. In this case, in point of fact, the air current is in practice in a horizontal direction to the rear from the trailing edge of the deflecting surface or of the wing, with high turbulence. It should also be noted that this deflecting surface is concave, contrary to most deflectors or streamlining.

According to the invention, the deflecting surface can have a radius of curvature of between 5 and 15 cm, in particular of the order of 9 cm, and the deflecting device formed by the deflecting surface and the wing(s) extends to a height which may be between 10 cm and 20 cm in relation to the body.

The invention also concerns a vehicle comprising in combination all or part of the characteristics mentioned above or below.

BRIEF DESCRIPTION OF THE DRAWINGS

Other characteristics and advantages of the invention will become apparent on reading the following description which refers to the attached figures in which:

FIG. 4 is a view from above of a vehicle according to the invention, FIGS. 5, 6 and 7 are diagrammatic views in section similar to FIG. 2 representing respectively variants of the invention.

DETAILED DESCRIPTION OF THE INVENTION

Figure 1:
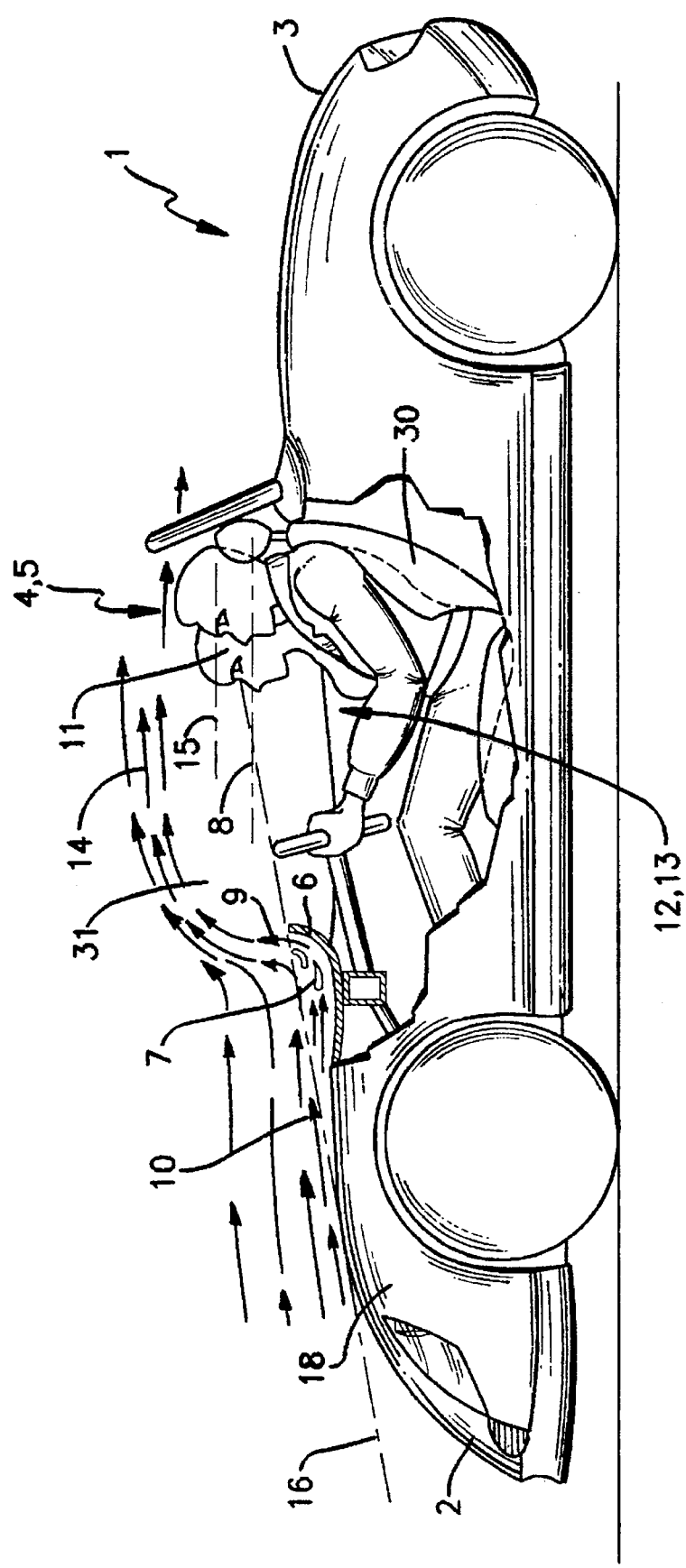
FIG. 1 is a partially cut away diagrammatic view in elevation of a vehicle according to the invention.
Figure 3:
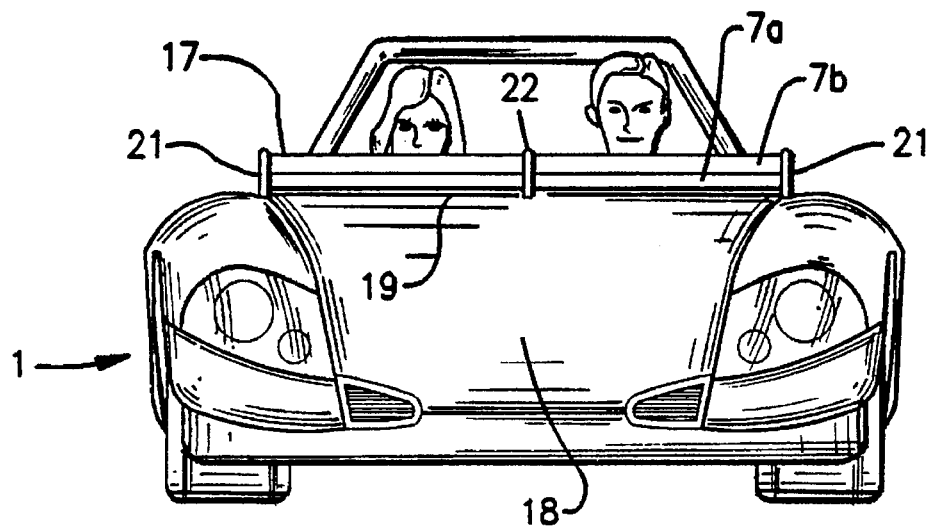
FIG. 3 is a front view of a vehicle according to the invention.

FIGS. 1, 3 and 4 represent an example of a vehicle according to the invention consisting of a motor car.

In all the text of the present application, vehicle 1 is assumed to move horizontally and the relative air current 10 created by movement of the vehicle is assumed to be horizontal. The vehicle 1 has a front end 2 and a rear end 3 defined in relation to its direction of movement. In all the text of the present application, the terms "front" and "rear" are used with reference to the direction of movement of the vehicle 1. Also, the terms "upstream" and "downstream" are used in the traditional manner with reference to the direction of movement of the relative air current 10.

The longitudinal direction of the vehicle 1 is the horizontal direction parallel to the horizontal movement of the vehicle. The transverse direction is the horizontal direction perpendicular to the longitudinal direction of movement of the vehicle.

In the example represented, the vehicle 1 comprises two front places 4, 5 namely a front driving place 4 able to receive a pilot or a driver and a front place 5 for a passenger. In any case, the vehicle 1 according to the invention comprises at least one front place, that is to say at least one driving place and/or passenger place which is situated furthest towards the front of the vehicle 1 and is thus not preceded by another drivers place and/or passenger place situated at the same height.

The front places 4, 5 of the vehicle 1 are defined by the means 30 for receiving each occupant and which, in the example shown, are the seats 30. These means of reception 30 can consist of a compartment, a saddle, a cockpit, etc according to the nature of the vehicle 1.

The means of reception 30 are inscribed in a volume defined by the body and/or the chassis of the vehicle.

In each front place 4, 5 of a vehicle, the regulations define, once the said means of reception 30 are determined, a standard zone 11 in which the eyes of the occupant of the said front place 4, 5 are situated, namely a zone in space in which the eyes of an occupant of standard height can be found. This zone 11 is inscribed in particular between a lower horizontal plane 8 and an upper horizontal plane The regulations also define the standard field of vision of the occupant and its lower limit 16 which is the plane passing through the said zone 11 and is tangential to the front portion 18 of the body at the front of the vehicle 1.

In the example shown, the lower limit 16 is a plane inclined forwards and downwards at an angle θ less than 10°, generally between 5° and 10°.

The front places 4, 5 can be defined by other means than the seats 30, for example by a single compartment defined by a body in box form with essentially vertical walls (it being posible for the front place to be a collective place where several passengers can stand). Such is perhaps for example the case with a motorboat having a promenade for tourists or with a coach, etc.

The vehicle 1 according to the invention comprises a deflecting device 6, 7 arranged in front of at least one front place 4, 5 and preferably advantageously at the front of each of the front places, 4, 5.

The deflecting device 6, 7 is formed of a deflecting surface 6 attached to the chassis and/or the body of the vehicle 1. This surface 6 extends at least essentially horizontally along the transverse direction of the vehicle and upwards in the relative air current created by movement of the vehicle. The deflecting surface 6 has a trailing edge directed upwards and is profiled. Its straight section running through any longitudinal vertical plane is curved concavely and its concavity is directed overall frontwards. In this way, the deflecting surface 6 deflects all the horizontal air current which it receives upwards, and more particularly at 90° in the vertical direction. The deflecting surface 6 thus forms a separating wall between the air current which it receives from the front, and a zone of still air free from turbulence situated behind the deflecting surface.

The deflecting device 6, 7 also comprises one (or more) wing(s) 7 attached to the vehicle 1. Each wing 7 extends in the incident relative air current immediately upstream, opposite and adjacent to the deflecting surface 6. The deflecting surface 6 and all the wings 7 form a deflecting device 6, 7, the aerodynamic characteristics of which depend on the choice of shape and dimensions of the deflecting surface 6 and on the number, shape, dimensions and position of each of the wings 7.

According to the invention, the deflecting surface 6 and the wing(s) (7) extend below the lower horizontal plane 8 of the standard zone 11 in which the eyes are situated. The deflecting device 6, 7 is also adapted to form, with the incident horizontal relative air current 10 in the deflecting device 6, 7 and created by movement of the vehicle, a deflected air flow g which flows upwards acting as an air screen in front of the space 12, 13 occupied by the said front place 4, 5 to a sufficient height so that the air is at rest and free from turbulence in the said standard zone 11 in which the eyes are situated. The deflected air flow 9 leaving the deflecting device 6, 7 thus protects a space 31 which extends immediately behind and above the deflecting surface 6 over a certain horizontal length. The deflected air flow 9 encounters, on leaving the deflecting device 6, 7 the relative horizontal air current 10 created by movement of the vehicle 1. The assembly forms a resulting air current 14 which passes above the said zone 11 and extends to the rear of the vehicle 1 (FIG. 1). The amplitude to which the horizontal relative air current 10 is turned vertically upwards by the deflected air flow 9, as well as the effectiveness of the protection afforded in the zone 11 depends on the energy conveyed by this deflected air flow 9 as it leaves the deflecting device 6, 7.

According to the invention, the deflecting device 6, 7 is adapted to create a deflected air flow 9 which flows upwards in a laminar regime with sufficient energy to deflect the relative air current 10 due to movement of the vehicle, above the said standard zone 11 in which the eyes are situated and more particularly above the upper horizontal plane 15 of this standard zone 11 in which the eyes are situated. In addition, the energy conveyed by the deflected air flow 9 is sufficient for the resulting current 14 to pass above the said zone 11 over a longitudinal distance at least equal to the longitudinal dimension of the said front place 4, 5 and more particularly of the entire passenger compartment of the vehicle. In point of fact, at the end of a certain longitudinal distance, the resulting air current 14 once again becomes turbulent and occupies all the height above the vehicle 1.

Thus the function of the deflecting device 6, 7 according to the invention is to turn, upwards and over a certain distance towards the rear, the incident horizontal relative air current 10 created by the movement of the vehicle so as to form a protected space 31 which remains perfectly still and free from turbulence, that is to say in which the air velocity is zero or negligible. This space 31 includes the standard zone 11 in which the eyes are situated.

In addition, and according to the invention, the whole of the deflecting device 6, 7 formed by the deflecting surface 6 and the wing(s) 7 extends entirely below the lower limit 16 of the standard field of vision corresponding to the said front place 4, 5. The deflecting device 6, 7 is adapted so that the deflected air flow 9 flows upwards above the upper horizontal plane 15 of the said standard zone 11 in which the eyes are situated. The vehicle 1 according to the invention is then characterized by the fact that it is does not have a windscreen. In spite of this, the occupant(s) of the vehicle is or are perfectly protected, and in particular at least as well protected as in a vehicle of the cabriolet type provided with a windscreen without a roof.

It has in point of fact been unexpectedly found that, in spite of there being little available space between the lower limit 16 of the standard field of vision and the body of the vehicle, it is possible to insert a deflecting device 6, 7 in this space, sufficiently effective to obtain appropriate protection, and this on condition that a concave deflecting surface 6 is used and at least one wing 7 as mentioned above.

The invention concerns more particularly and advantageously a vehicle of the type comprising a front portion of the body 18 which extends in front of the front place(s) forming a continuous surface, at least essentially horizontal, between the front place(s) 4, 5 and the front end 2 of the vehicle 1.

According to the invention, the deflecting surface 6 then extends in a projection upwards in relation to this front portion 18 of the body of the vehicle, in the relative air current 10 which is at least essentially horizontal and which is created along the front portion 18 of the body. The front portion 18 of the body consists for example of a front bonnet of the vehicle extending between the front end 2 and the front limit of the space 12, 13 occupied by the said front place 4, 5 defined by the body and/or the chassis.

More particularly, the deflecting surface 6 is attached immediately in front of the said front place 4, 5, in the rearwards extension of the rear part 19, which extends at leash essentially horizontally, from this front portion 18 of the body. In other words, the deflecting surface 6 extends overall to the place reserved for the windscreen in a traditional vehicle of the prior art.

The deflecting surface 6 comprising a front connecting part 20 which extends at least essentially horizontally and which is attached continually, tangentially and in a sealed manner to the rearwards extension of the rear part 19 of the said front portion 18 of the body. The seal between the deflecting surface 6 and the rear part 19 of the body is perfect over all the dimension of this surface 6 along the transverse direction of the vehicle 1. Nevertheless, within the context of the present invention, this concept of a perfect seal includes the possibility of providing if required, as a variant not shown and in a traditional manner, air intakes or vents of small dimensions, generally provided with manual means of control, for the ventilation of passengers.

Thus, the deflecting surface 6 is rigidly attached in a sealed manner to a lower transverse element 19 of the body (which is formed of the rear part of the front portion 18 of the body in the examples represented) so that the relative air current escapes entirely or almost entirely above the trailing edge 17, no air current flowing under the deflecting surface 6, in particular between the body and this surface 6.

In this way, no air current inadvertently enters the space 12, 13 occupied by the front places 4, 5 when the vehicle is moving.

The deflecting surface 6 is rigidly attached for example by bolting and/or riveting or by another method, to the body and/or the chassis of the vehicle 1 and cannot normally be moved in relation to the vehicle 1. The vehicle 1 according to the invention can nevertheless comprise means for adjusting the tilt and/or the position of the deflecting surface 6. For example, this deflecting surface 6 can be mounted to slide on a rail horizontally and/or vertically or on or between pivoting plates which enable these adjustments to be made while ensuring locking in position.

In the example represented, the deflecting surface 6 is formed of a continuous extension of the front bonnet 18 of the body. It is thus in one piece with the front portion of the body.

Similarly, each of the wings 7 is attached rigidly and normally cannot be moved in relation to the vehicle 1. Here again, means can be provided for adjusting the position and/or the tilt of each of the wings 7. For example, each wing 7 has its end rigidly attached to a plate which can be mounted to slide horizontally and/or vertically and/or can pivot in relation to a support rigidly attached to the body and/or the chassis.

In the example represented, each wing 7 carries a plate 21 attached at each of its lateral ends, and this plate 21 is attached no the body of the vehicle 1. As will be seen in FIG. 3, the deflecting device 6, 7, formed by the deflecting surface 6 and each of the wings 7 extends along all the width of the front places 4, 5 and hence along all the width of the vehicle 1. More precisely, the deflecting device 6, 7 extends over all the width of the rear part 19 of the said front portion 18 of the body which is situated in front of the front places 4, Each wing 7 is formed along its length in two parts, each part extending in front of the two front places 4, 5. The two parts of each wing 7 are reunited at the centre of the vehicle by a central plate 22 attached to the body.

The deflecting device 6, 7 extends entirely under the lower limit 16 of the field of vision corresponding to the front places 4, 5, that is to say it has no part projecting above this lower limit 16. In practice, the lower limit 19 of the field of vision is a plane which passes through the lowest standard position in which the eyes of an occupant of standard height corresponding to the vehicle 1 are situated, and is tangential to the front to the front portion 18 of the body. This plane is inclined forwards and downwards. Thus the trailing edge 17 of the deflecting surface 6 can be placed at a height slightly above the trailing edge 23 furthest downstream from the wing(s) 7, these two trailing edges 17, 23 being both below the limit 16.

According to the invention, the trailing edge 17 of the deflecting surface is not inclined forwards or backwards at an angle greater than 45° to the vertical. More particularly, the trailing edge 17 is directed upwards forming an angle with the vertical direction (namely with a transverse vertical plane of the vehicle) which is less than 45°, in particular less than 10°.

According to the invention, the trailing edge 17 of the deflecting surface 6 is advantageously directed at least essentially vertically, that is to say perpendicularly to the incident relative air current 10 created by the movement of the vehicle, at 90° upwards in relation to the direction of relative movement of the air current 10.

The deflecting surface 6 has a profile, the curvature of which is the most regular one possible and the least possible between its front park 20 which extends at least essentially horizontally and its trailing edge 17 which extends at least essentially vertically. In particular and according to the invention, the profile of the deflecting surface 6 is at least essentially circular. The radius of curvature of this circular profile is determined by the fact that the trailing edge 17 extends vertically and through the available height to locate the deflecting surface 6 between the lower limit 16 of the field of vision and the body.

The radius of curvature of the deflecting surface 6 of a vehicle according to the invention may be between 5 and 15 cm, in particular of the order of 9 cm.

The wing(s) 7 define a leading edge 24, which is the leading edge 24 of the wing 7 positioned furthest upstream. According to the invention, this leading edge 24 extends opposite and above the front part 20 connecting the deflecting surface 6 to the front portion 18 of the body of the vehicle. Similarly, the wing(s) 7 define a trailing edge 23 which is the trailing edge 23 of the wing 7 furthest downstream in relation to the air current. This trailing edge 23 faces at the front and is slightly below the trailing edge 17 of the deflecting surface 16.

According to the invention, the effective section of the entry for the air current 10, which is defined between the leading edge 24 of the wing(s) 7 and the part 20 nearest to the deflecting surface 6, has an area less than the area of the effective section of the exit for the deflected flow 9, which is defined between the trailing edge 23 of the wing(s) 7 and the part 17 (trailing edge) nearest to the deflecting surface 6. Thus, the space between the entry section and exit section is overall divergent.

Each wing 7 has overall a concave section with its concavity facing forwards which corresponds at least essentially to that of the deflecting surface 6. Nevertheless, each wing 7 has advantageously and preferably an average curvature which is less than that of the deflecting surface 6.

Advantageously and according to the invention, each of the wings 7 has a curved blade profile with a concave intrados and a convex extrados, which is determined in the manner of a fixed deflecting blade. This profile is determined so that the deflected flow 9 is laminar and has a maximum energy in the vertical direction at the exit from the deflecting device 6, 7.

More particularly, the distance between the leading edge 24 of the wing 7 furthest upstream and the deflecting surface 6 is less than the distance between the trailing edge 23 of the wing 7 furthest downstream and the deflecting surface 6. In addition, the wing 7 of the device 6, 7 which is closest to the deflecting surface 6, extends at a distance from this deflecting surface 6 which is between 1 cm and 20 cm, and more particularly of the order of 2 to 10 cm. The distance separating the wing 7 nearest to the deflecting surface 6 and this deflecting surface 6 is at least essentially the same all along the deflecting surface 6 across the width of the vehicle. In the case where the device has several wings 7, it is the same for the distance which separates the wings 7 in pairs from each other.

Figure 2:
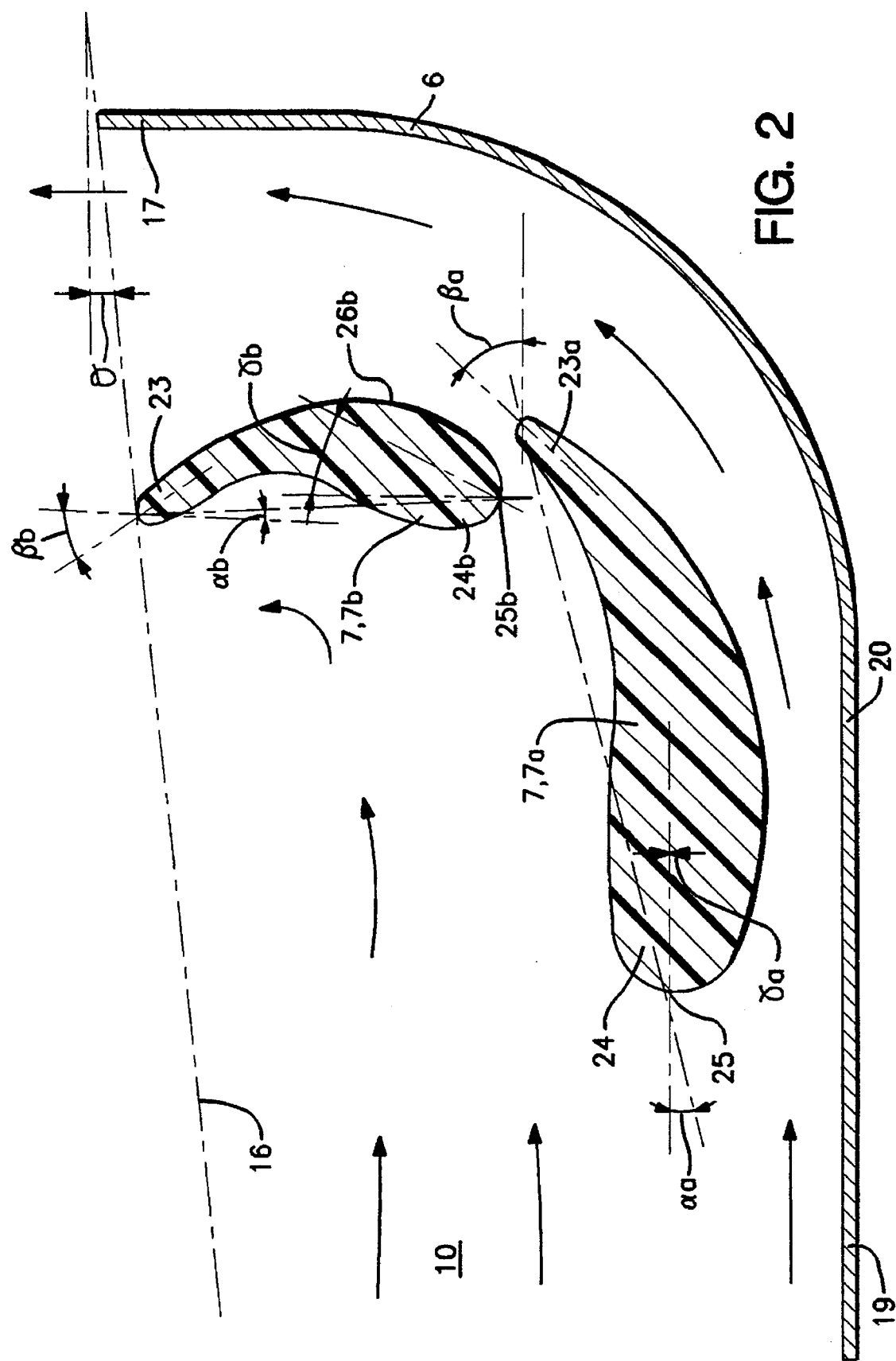
FIG. 2 is an enlarged view in section through a longitudinal plane of the deflecting device of the vehicle of FIG. 1.

The leading edge 24 of the wing 7 furthest upstream defines, in a traditional manner, a middle neutral line 25 in relation to the incident air current 10 (FIG. 2). According to the invention, the distance between the neutral line 25 of the leading edge 23 of the wing 7 furthest upstream and the deflecting surface g is between 1 cm and 5 cm, in particular of the order of 3 cm.

In addition, the distance between the trailing edge 23 of the wing 7 furthest downstream and the deflecting surface is advantageously between 3 cm and 10 cm, and more particularly of the order of 6 cm.

The deflecting surface 6 and each of the wings 7 extend overall parallel to each other along the transverse direction of the vehicle. The general shape taken by the deflecting surface 6 and each of the wings 7 can be strictly straight to correspond to the transverse direction of the vehicle 1, or as a variant, be more or less arched in a horizontal plane and/or in a transverse vertical plane, in particular for questions of the general aesthetics of the vehicle. For example, the lateral ends can be further to the rear, the deflecting device 6,7 having a varying degree of convexity facing forwards. On the other hand, the deflecting device 6, 7 may have a certain concavity towards the front. Equally, the lateral ends of the deflecting device 6, 7 may be lower than the middle axial portion, this device having a convexity pointing upwards.

From the aerodynamic point of view and according to the invention, it is however preferable for the deflecting device 6, 7 to be strictly perpendicular to the incident relative air current 10, the direction of which depends on the shape of the front portion 18 of the body.

In the embodiment represented in FIG. 5, the deflecting device 6, 7 comprises a single wing 7 positioned in front of the deflecting surface 6. This wing 7 has a convex extrados 26 facing the deflecting surface 6. The curvature of this convex extrados 26 of the wing 7 may be at least essentially the same as, or less than, or equal to that of the deflecting surface 6. The concave intrados 27 of the wing 7 is calculated to obtain an upwards laminar deflected air flow 9 at the exit from the trailing edge 23.

In the variant of FIG. 5, a front upper screen 28 is also represented extending towards the front of the wing 7 above the front portion 18 of the body to mask, as much as possible, the wing 7 and the deflecting surface 6. This screen 28 has a shape and dimensions that are determined to be the most neutral possible in relation to the relative air current so as not to disturb the aerodynamic functioning of the deflecting device 6, 7. The screen 28 has thus essentially an aesthetic function. In is attached to the sides of the body and possibly by a rid extending along the middle longitudinal axis of the vehicle. In the example represented, the shield 28 overlaps the deflecting surface g and the wing 7 and extends forwards slightly inclined downwards. It is profiled in the manner of a biconvex flat wing. Opposite the trailing edge 23 of the wing 7, the shield 28 comprises an outlet opening 32 for the deflected air flow 9. In the case of a wing 7 in two longitudinal parts, the shield 28 comprises two outlet openings 32, one opposite and in front of each front place 4, 5. The free transverse rear edge of each outlet opening 32 defines the trailing edge 17 of the deflecting surface 6.

FIG. 2 represents a preferred variant of the invention in which the deflecting device 6, 7 comprises two wings 7a, 7b arranged in relation to each other in the manner of a split wing. Thus the device comprises a lower front wing 7a, arranged further forward and downwards, than is to say upstream in relation to the relative air current, and an upper rear wing 7b arranged further to the rear and upwards, that is to say further downstream in relation to the relative air current.

In all the present application, the "blade angle" of a wing in relation to a fixed direction of the vehicle is understood to mean the angle defined between this direction and the direction passing through the neutral line of the leading edge and through the neutral line of the trailing edge of this wing. According to the invention, the lower front wing 7a has a profile, the blade angle of which $\alpha a$ in relation to the longitudinal horizontal direction is less than 45°, in particular of the order of 15°. In addition the leading edge 24 of the wing 7a situated furthest upstream has a lower angle of incidence $\gamma a$, less than 10°, in particular zero in relation to the relative air current 10. In other words, the angle of incidence $\gamma a$ formed by the neutral line 25 of the leading edge 24 of the lower front wing 7a with the longitudinal horizontal direction is small, less than 10°, preferably less than 5°. In the example represented the angle $\gamma a$ is zero, The upper rear wing 7b has a profile directed at least essentially vertically. The upper rear wing 7b has a profile the blade angle of which $\alpha b$ in relation to the vertical direction is small, namely less than 5°. In the example represented and according to the invention, this blade angle $\alpha b$ may be negative, the trailing edge 23 being placed further forward than the neutral line 25b of the leading edge 24b of this wing 7b.

In addition, the trailing edge 23 of the wing situated furthest downstream 7b is inclined forwards in relation to the vertical direction at an angle βb of between 0° and 45°, in particular of the order of 30°.

The trailing edge 23a of the lower front wing 7a forms an angle βa of between 20° and 60°, in particular of the order of 45°, in relation to the longitudinal horizontal direction. This trailing edge 23a of the lower front wing 7a extends immediately below the leading edge 24b of the upper rear wing 7b, and the neutral line 25b of the leading edge 24b of the upper rear wing 7b forms an angle of incidence γb of between 10° and 45°, in particular of the order of 30°, in relation to the vertical direction.

Equally, and according to the invention, the trailing edge 23a of the lower front wing 7a extends at least essentially vertical to the vertical direction tangential to the extrados 26b of the upper rear wing 7b.

The split of the split aileron formed by the two wings 7a, 7b has a thickness of between 3 mm and 20 mm, in particular between 5 mm and 10 mm. Thus, the trailing edge 23a of the lower front wing 7a is separated from the leading edge 24b of the upper rear wing 7b by a distance of between 3 mm and 20 mm, in particular between 5 mm and 10 mm.

The deflecting device 6, 7a, 7b thus formed, represented full scale in FIG. 2 was placed on a motor car without a windscreen as represented in FIGS. 1, 3 and 4. It was found, surprisingly, that this deflecting device enabled the occupants of the two front places 4, 5 of the vehicle 1 to be protected at all speeds at which the vehicle was used, and in particular between 10 km/h and 250 km/h. In spite of the absence of a windscreen, the occupants could open their eyes without receiving any draught and could converse as in the passenger compartment of a saloon. These results were also obtained with the deflecting device 6, 7 of FIG. 5.

Figure 7:
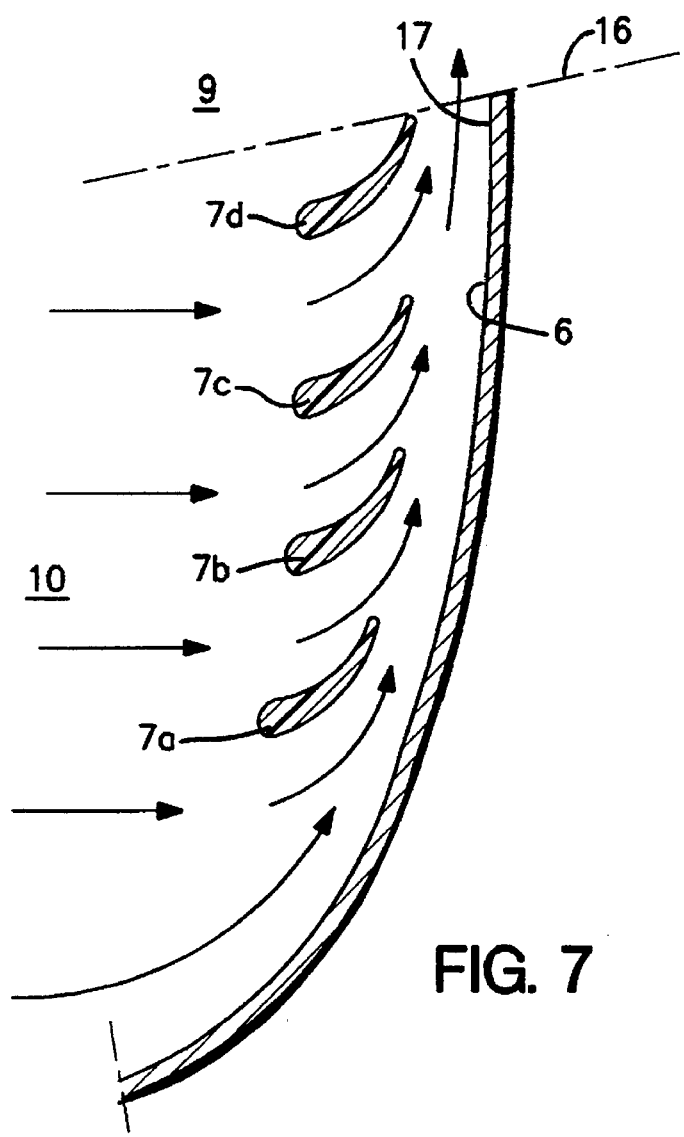
Figure 6:
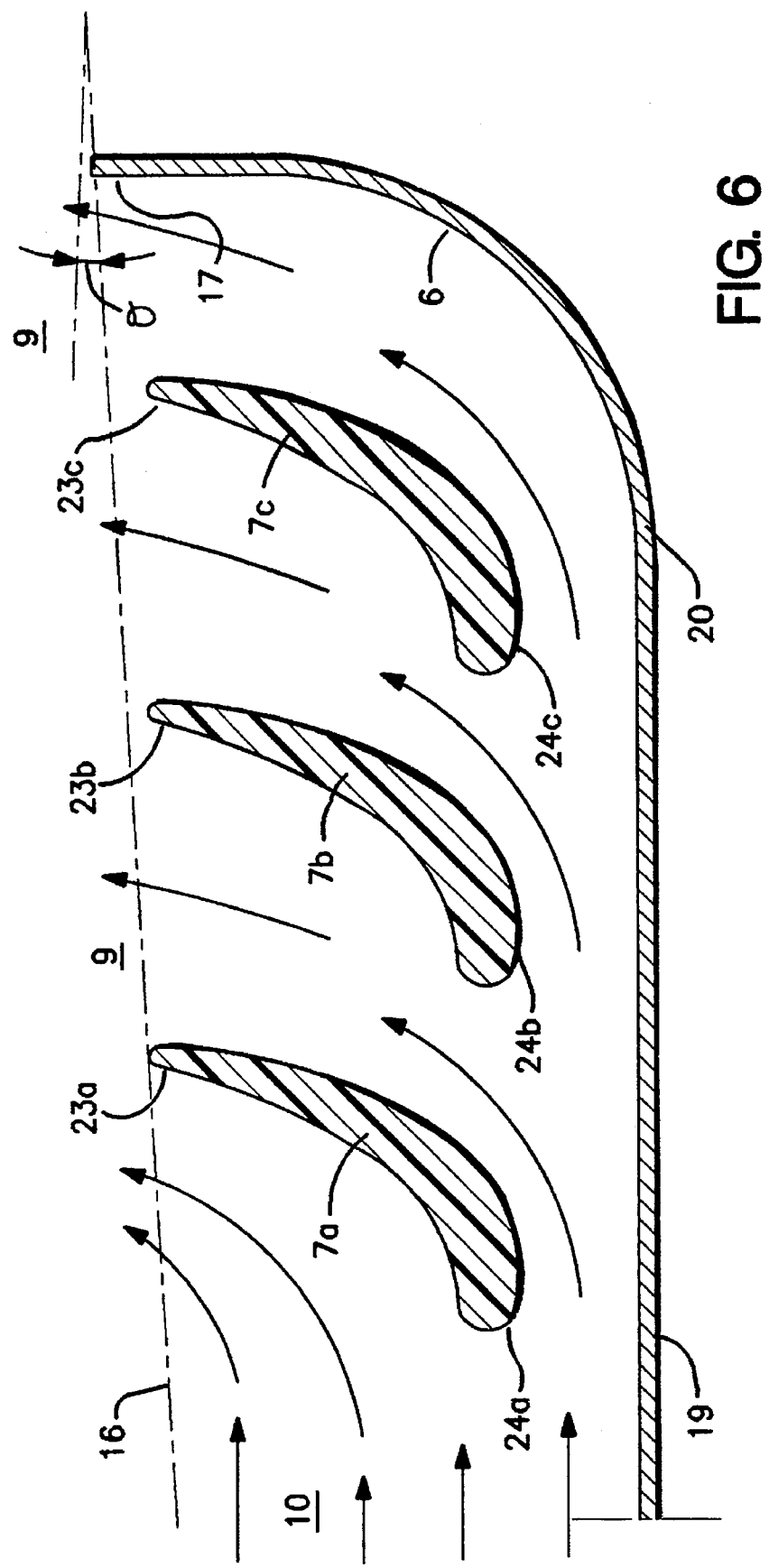

FIGS. 6 and 7 represent other variants of the invention in which the vehicle has several similar wings 7 extending at least essentially parallel to each other, adjacent to each other and defining between them a grill of wings traversed by the incident relative air current 10 which is deflected upwards.

In the variant represented in FIG. 6, three wings 7a, 7b, 7c are placed side by side from the front towards the rear of the vehicle. The distance which separates the leading edges 24a, 24b, 24c of the front portion 20 from the deflecting surface 6 is greater for the wing 7a situated furthest forward and is less for the wing 7c situated furthest to the rear. This distance thus decreases from the front towards the rear. The trailing edges 23a, 23b, 23c of the various wings 7a, 7b, 7c are aligned along the lower limit 16 of the standard field of vision corresponding to the front places 4, 5.

In the variant of FIG. 7, four wings 7a, 7b, 7c, 7d are placed side by side along a direction at least essentially vertical which corresponds to the general direction of the deflecting surface 6. This variant is applicable when there is sufficient height to accommodate the deflecting surface 6 in front of the front places of the vehicle.

It is quite obviously possible to combine the different variants of the invention, provided that a sufficiently large space is available in height and/or in length between the lower limit 16 of the field of vision and the body.

The invention is applicable not only to a motor car with a single place, or two places or comprising a greater number of places, but also to other categories of vehicle such as motor cycles, mopeds or sidecars, aircraft (and more particularly aircraft of the microlight type), motorboats, etc.

In addition, the invention may be the subject of other variants than those represented in the figures, in relation to each application and each category and size of vehicle.

I claim:

1. A vehicle intended to travel at subsonic speed, comprising:

means defining at least one front place for at least one occupant with a standard zone in which the eyes are situated and which is inscribed between a lower horizontal plane and an upper horizontal plane, said means being open forward of said standard zone, an air deflecting device comprising a deflecting surface attached, in front of said at least one front place, to a front portion of said vehicle receiving a relative air current when said vehicle is moving, said deflecting surface:

extending overall at least essentially in the transverse direction of said vehicle, having a concave profile, with a concavity facing forwards, having a trailing edge directed upwards, so that at least a substantial fraction of said relative air current escapes above said upper trailing edge of said deflecting surface, wherein:

said air deflecting device further comprises at least one wing having a curved, generally concave profile with a concavity facing forwards, said at least one wing defining a furthest upstream leading edge and a furthest downstream trailing edge, said at least one wing being attached to said vehicle and extending in said relative air current immediately upstream, opposite and adjacent to said deflecting surface, said furthest upstream leading edge of said at least one wing extends facing at a distance above said deflecting surface, said furthest downstream trailing edge of said at least one wing extends at least essentially forwards and facing at a distance towards said deflecting surface, said air deflecting device is disposed below said lower horizontal plane of said standard zone, the distance between said furthest upstream leading edge of said at least one wing and said deflecting surface is less than the distance between said furthest downstream trailing edge of said at least one wing and said deflecting surface, said deflecting surface and at least one wing are adapted to form an air flow which is deflected upwards and flows upwards in a laminar regime in front of said standard zone and above said upper horizontal plane, with sufficient energy to deflect said substantial fraction of said relative air current above said standard zone, in which the air is at least essentially still.

2. A vehicle according to claim 1, wherein said trailing edge of said deflecting surface is directed at least substantially vertically.

3. A vehicle according to claim 1, wherein said trailing edge of said deflecting surface forms an angle less than 10° with a vertical direction.

4. A vehicle as claimed in claim 1, wherein said air deflecting device extends under a plane representing a lower limit of a normal field of vision corresponding to said front place, passing through said standard zone and tangential to said front portion of said vehicle, wherein said air deflecting device is adapted so that said deflected air flow flows upwards and above said upper horizontal plane of said standard zone, and wherein said vehicle has no windscreen in the front.

5. A vehicle according to claim 1, wherein said furthest downstream trailing edge of said at least one wing extends at least essentially facing towards said trailing edge of said deflecting surface.

6. A vehicle as claimed in claim 1, wherein said deflecting surface is rigidly attached in a sealed manner to said front portion.

7. A vehicle as claimed in claim 1, wherein said front portion extends in front of said front place, forms a continuous surface at least essentially horizontal forward of said front place, and wherein said deflecting surface extends in a projection upwards in relation to said front portion in said relative air current created along said front portion.

8. A vehicle as claimed in claim 7, wherein said deflecting surface is attached immediately in front of said front place in the rearward extension of a rear part of said front portion of the body, wherein said deflecting surface comprises a front connecting part which extends at least essentially horizontally and is continuously attached tangentially as a rearwards extension of said rear part of said front portion, and wherein said furthest upstream leading edge of said at least one wing extends facing above said front connecting part of said deflecting surface.

9. A vehicle as claimed in claim 1, wherein said deflecting surface is profiled with a straight section passing through any longitudinal vertical plane which is a concave curve.

10. A vehicle as claimed in claim 1, wherein said air deflecting device extends at least essentially over all the width of each front place of said vehicle.

11. A vehicle as claimed in claim 1, wherein said air deflecting device extends at least essentially over all the width of said vehicle.

12. A vehicle as claimed in claim 1, wherein each wing has a thick curve profile which is determined as a fixed deflecting vane with a concave intrados and a convex extrados, and which corresponds at least substantially to the profile of said deflecting surface.

13. A vehicle as claimed in claim 1, wherein said at least one wing comprises a wing closest to said deflecting surface which extends at a distance from said deflecting surface of between 1 cm and 20 cm.

14. A vehicle as claimed in claim 1, wherein the distance separating each wing and said deflecting surface is at least essentially the same all along said deflecting surface, in the transverse direction of said vehicle.

15. A vehicle as claimed in claim 1, wherein an entry section defined between said furthest upstream leading edge of said at least one wing and a part of said deflecting surface which is closest to said furthest upstream leading edge, has an area less than that of an exit section defined between said furthest downstream trailing edge of said at least one wing and a part of said deflecting surface which is closest to said furthest downstream trailing edge.

16. A vehicle as claimed in claim 1, wherein the distance between a neutral line of said furthest upstream leading edge of said at least one wing and said deflecting surface is between 1 cm and 5 cm.

17. A vehicle as claimed in claim 1, wherein the distance between said furthest downstream trailing edge of said at least one wing and said deflecting surface is between 3 cm and 10 cm.

18. A vehicle as claimed in claim 1, comprising one single wing having a concave intrados directed forwards and a convex extrados directed in front of and facing said deflecting surface.

19. A vehicle as claimed in claim 18, wherein said deflecting surface has a curve profile with a curvature, and wherein said wing has a convex curvature of the extrados which is less than or equal to said curvature of said deflecting surface.

20. A vehicle as claimed in claim 18, wherein said deflecting surface has a curve profile with a curvature, and wherein said wing has a convex curvature of the extrados which is at least essentially the same as said curvature of said deflecting surface.

21. A vehicle as claimed in claim 1, comprising several similar wings extending at least parallel to each other, side by side to each other and defining between them a grille of wings traversed by said relative air current which is deflected upwards.

22. A vehicle as claimed in claim 1, comprising two wings: a lower front wing situated furthest forward and downwards, which has a profile having a blade angle less than 45° relative to a longitudinal horizontal direction and an upper rear wing situated furthest to the rear and upwards, which has a profile directed at least essentially vertically.

23. A vehicle as claimed in claim 22, wherein said lower front wing has a trailing edge which is inclined forwards in relation to a vertical direction at an angle of between 0° and 45°.

24. A vehicle as claimed in claim 22, wherein said upper rear wing has a leading edge which has an angle of incidence less than 10° in relation to said relative air current.

25. A vehicle as claimed in claim 22, wherein said upper rear wing has a profile having a blade angle less than 5° in relation to a vertical direction.

26. A vehicle as claimed in claim 22, wherein said upper rear wing has a profile having a negative blade angle in relation to a vertical direction.

27. A vehicle as claimed in claim 22, wherein said lower front wing has a trailing edge which extends immediately under a leading edge of said upper rear wing.

28. A vehicle as claimed in claim 22, wherein said lower front wing has a trailing edge extending vertically to a vertical direction which is tangential to an extrados of said upper rear wing.

29. A vehicle as claimed in claim 1, wherein said deflecting surface has a radius of curvature between 5 and 15 cm.

30. A vehicle as claimed in claim 1, wherein said deflecting device extends over a height of between 10 cm and 20 cm in relation to said front portion.

31. A vehicle intended to travel at subsonic speed, comprising:

means defining at least one front place for at least one occupant with a standard zone in which the eyes are situated and which is inscribed between a lower horizontal plane and an upper horizontal plane, said means being open forward of said standard zone, an air deflecting device comprising a deflecting surface attached, in front of a front place, to a front portion of said vehicle receiving a relative air current when said vehicle is moving, said deflecting surface:

extending overall at least essentially in the transverse direction of said vehicle, having a concave profile, with a concavity facing forwards, having a trailing edge directed upwards, so that at least a substantial fraction of said relative air current escapes above said upper trailing edge of said deflecting surface, wherein:

said air deflecting device further comprises at least one wing having a thick curved, generally concave profile which is determined as a fixed deflecting vane, with a concavity facing forwards, a concave intrados and a convex extrados, said at least one wing defining a furthest upstream leading edge and a furthest downstream trailing edge, said at least one wing being attached to said vehicle and extending in said relative air current immediately upstream, opposite and adjacent to said deflecting surface, said furthest upstream leading edge of said at least one wing extends facing at a distance above said deflecting surface, said furthest downstream trailing edge of said at least one wing extends at least essentially forwards and facing at a distance towards said deflecting surface, said trailing edge of said deflecting surface is directed at least essentially vertically, said air deflecting device is disposed below said lower horizonal plane of said standard zone, the distance between said furthest upstream leading edge of said at least one wing and said deflecting surface is less than the distance between said furthest downstream trailing edge of said at least one wing and said trailing edge of said deflecting surface, said deflecting surface and said at least one wing are adapted to form an air flow which is deflected upwards and flows upwards in a laminar regime in front of said standard zone and above said upper horizontal plane with sufficient energy to deflect said substantial fraction of said relative air current above said standard zone in which the air is at least essentially still.

32. A vehicle intended to travel at subsonic speed, comprising:

means defining at least one front place for at least one occupant with a standard zone in which the eyes are situated and which is inscribed between a lower horizontal plane and an upper horizontal plane, and with a normal field of vision, said means being open forward of said standard zone, an air deflecting device comprising a deflecting surface attached, in front of a front place, to a front portion of said vehicle receiving a relative air current when said vehicle is moving, said deflecting surface:

extending overall at least essentially in the transverse direction of said vehicle, having a concave profile, with a concavity facing forwards, having a trailing edge directed upwards, so that at least a substantial fraction of said relative air current escapes above said upper trailing edge of said deflecting surface, wherein:

said air deflecting device further comprises at least one wing having a thick curved, generally concave profile which is determined as a fixed deflecting vane, with a concavity facing forwards, a concave intrados and a convex extrados, said at least one wing defining a furthest upstream leading edge and a furthest downstream trailing edge, said at least one wing being attached to said vehicle and extending in said relative air current immediately upstream, opposite and adjacent to said deflecting surface, said furthest upstream leading edge of said at least one wing extends facing at a distance above said deflecting surface, said furthest downstream trailing edge of said at least one wing extends at least essentially forwards and facing at a distance towards said deflecting surface, said trailing edge of said deflecting surface is directed at least essentially vertically, said air deflecting device is disposed below said lower horizontal plane of said standard zone, said air deflecting device is disposed under a plane, called the lower limit of the normal field of vision corresponding to said front place, passing through said standard zone and being tangential to said front portion of said vehicle, said deflecting surface and at least one wing are adapted to form an air flow which is deflected upwards and flows upwards in a laminar regime in front of said standard zone and above said upper horizontal plane, with sufficient energy to deflect said substantial fraction of said relative air current above said standard zone in which the air is at least essentially still, said vehicle has no windscreen in the front.

33. A vehicle intended to travel at subsonic speed, comprising:

means defining at least one front place for at least one occupant with a standard zone in which the eyes are situated and which is inscribed between a lower horizontal plane and an upper horizontal plane, said means being open forward of said standard zone, an air deflecting device comprising a deflecting surface attached, in front of a front place, to a front portion of said vehicle receiving a relative air current when said vehicle is moving, said deflecting surface:

extending overall at least essentially in the transverse direction of said vehicle, comprising a front connecting part attached in the rearwards extension of said front portion, being profiled with a concave profile, with a concavity facing forwards, having a trailing edge directed upwards, so that at least a substantial fraction of said relative air current escapes above said upper trailing edge of said deflecting surface, wherein:

said air deflecting device further comprises at least one wing having a curved, generally concave profile with a concavity facing forwards, said at least one wing defining a furthest upstream leading edge and a furthest downstream trailing edge, said at least one wing being attached to said vehicle and extending in said relative air current immediately upstream, opposite and adjacent to said deflecting surface, said furthest upstream leading edge of said at least one wing extends facing at a distance above said front connecting part of said deflecting surface, said furthest downstream trailing edge of said at least one wing extends at least essentially forwards and facing at a distance towards said trailing edge of said deflecting surface, said air deflecting device is disposed below said lower horizontal plane of said standard zone, the distance between said furthest upstream leading edge of said at least one wing and said deflecting surface is less than the distance between said furthest downstream trailing edge of said at least one wing and said deflecting surface, said deflecting surface and at least one wing are adapted to form an air flow which is deflected upwards and flows upwards in a laminar regime in front of said standard zone and above said upper horizontal plane, with sufficient energy to deflect said substantial fraction of said relative air current above said standard zone, in which the air is at least essentially still.

34. A vehicle intended to travel at subsonic speed, comprising means defining at least one front place for at least one occupant with a standard zone in which the eyes are situated, said means being open forward of said standard zone, wherein said vehicle comprises an air deflecting device comprising a deflecting surface and at least one wing, and wherein:

said deflecting surface is attached to said vehicle in front of said front place and extends overall at least substantially in the transverse direction of said vehicle so as to receive a relative air current when said vehicle is moving, said deflecting surface has a concave shape with a concavity facing forward and an upper trailing edge directed upwards, said deflecting surface is attached to a front portion of said vehicle receiving said relative air current and extends in a rearwards extension of said front portion, so that at least a substantial fraction of said relative air current escapes above said trailing edge of said deflecting surface behind which the air is essentially still, each said wing is attached to said vehicle and extends in said relative air current immediately upstream, opposite and adjacent to said deflecting surface, said air deflecting surface and each said wing are disposed below a lower horizontal plane passing through said standard zone, said air deflecting device is adapted to form an air flow deflected upwards and adapted to act as an air screen in front of said standard zone, in which the air is at least essentially still, said air deflecting device comprises an upper shield overlapping said deflecting surface and said at least one wing.

35. A vehicle according to claim 34, wherein said shield comprises an outlet opening for said deflected air flow in front of said front place.

36. A vehicle according to claim 35, wherein said outlet opening comprises a free transverse rear edge which defines said trailing edge of said deflecting surface.

37. A vehicle according to claim 34, wherein said shield is inclined forward and downward.

* * * * *